(12) United States Patent
Jain (10) Patent No.: US 12,431,739 B1
(45) Date of Patent: Sep. 30, 2025

(54) WIRELESS POWER TRANSMITTER AND ASSOCIATED METHOD

(71) Applicant: STMICROELECTRONICS INTERNATIONAL N.V., Geneva (CH)

(72) Inventor: Akshat Jain, Nahan (IN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/745,243

(22) Filed: Jun. 17, 2024

(51) Int. Cl.
*H02J 50/10* (2016.01)
*H02J 50/80* (2016.01)
*H04B 5/79* (2024.01)
*H02J 50/00* (2016.01)

(52) U.S. Cl.
CPC .............. *H02J 50/10* (2016.02); *H02J 50/80* (2016.02); *H04B 5/79* (2024.01); *H02J 50/001* (2020.01)

(58) Field of Classification Search
CPC .......... H02J 50/10; H02J 50/80; H02J 50/001; H04B 5/79
USPC ........................................................ 307/104
See application file for complete search history.

(56) References Cited

U.S. PATENT DOCUMENTS

| | | | | |
|---|---|---|---|---|
| 8,249,500 | B2 * | 8/2012 | Wilson | G06K 7/10237 327/564 |
| 9,048,747 | B2 * | 6/2015 | Ansari | G05F 1/10 |
| 9,111,401 | B2 * | 8/2015 | Dansachmueller | H04W 12/03 |
| 9,959,536 | B1 | 5/2018 | Shivnaraine et al. | |
| 2010/0171369 | A1 * | 7/2010 | Baarman | H04B 5/72 307/104 |
| 2014/0187154 | A1 * | 7/2014 | Sabouri | H04W 52/0245 455/41.1 |
| 2021/0328625 | A1 | 10/2021 | Tramoni et al. | |
| 2023/0118967 | A1 | 4/2023 | Choi et al. | |

FOREIGN PATENT DOCUMENTS

WO WO 2023/215732 A1 11/2023

* cited by examiner

*Primary Examiner* — Alfonso Perez Borroto
(74) *Attorney, Agent, or Firm* — Alston & Bird LLP (57) ABSTRACT

In accordance with various embodiments of the present disclosure, a wireless power transmitter is provided. In some embodiments, the wireless power transmitter comprises an inverter electrically connected to a transmit power coil to receive an alternating current (AC) input voltage and configured to provide power to the transmit power coil to enable wireless power transmission, near field communication (NFC) transmit circuitry electrically connected to and providing power to an NFC transmit coil to enable NFC communication, and a controller electrically connected to the inverter and to the NFC transmit circuitry and configured to disable the inverter from providing power to the transmit power coil and enable the NFC transmit circuitry to provide power to the NFC transmit coil during a plurality of NFC communication time slots. A beginning and an end of each of the NFC communication time slots is determined based on the AC input voltage.

15 Claims, 3 Drawing Sheets

WIRELESS POWER TRANSMITTER AND ASSOCIATED METHOD

FIELD OF THE INVENTION

Example embodiments of the present disclosure relate generally to wireless power systems and, more particularly, to communications in wireless power systems.

BACKGROUND

Wireless power transfer is a technology that allows electrical energy to be transmitted from a power source to an electrical device without the need for physical connectors or wires. Ki Cordless Kitchen is a standard for wirelessly delivering up to 2200 watts of power to smart cordless appliances (which may be referred to generally as "receivers"), such as rice cookers, toasters, blenders, coffee makers, air fryers, and more. These special appliances do not need to be plugged into an electrical outlet, as they receive power wirelessly from special power transmitters upon which the appliance is placed. The power transmitters may be, for example, standalone, built into an induction cooktop, or built into a countertop.

The power transmitter receives AC power from an AC main and an inverter energizes a transmitter (Tx) power coil. The Tx power coil energizes a receiver (Rx) power coil in the appliance, which in turn provides operational power to the rest of the appliance.

Communication between the receiver (appliance) and the transmitter is accomplished using near field communication (NFC). Such communication includes configuration setup and power requirements. For example, if a user selects a higher blade speed on a blender, the blender will communicate to the transmitter a request to provide additional power to drive the blade faster. The transmitter and the receiver each have an NFC coil that is energized to enable communication between the transmitter and the receiver. During setup, the (much lower) power required by the receiver is sent from the transmitter to the receiver via the NFC coils.

Because of the close proximity of the power coils and the NFC coils, it is important that the power transfer and NFC communications do not happen concurrently. If the power transfer and NFC communications occur simultaneously, the strong magnetic field of the power transmitter will get coupled with the small NFC signal antenna. This will not only affect the NFC communication but can also lead to failure of the NFC hardware.

To prevent simultaneous power transfer and NFC communication, the Ki Cordless Kitchen standard specifies that, at every zero crossing of the AC main voltage, the power transfer is stopped for a specified time interval to allow the NFC communication to occur. After the specified time interval, the NFC communication stops, and the power transfer starts again. These time intervals are called NFC communication time slots, NFC time slots, or simply NFC slots.

Because the NFC communication time slots starts before the zero crossing of the AC mains voltage, one approach that has been used to determine the start of the NFC communication time slot is based on an elapsed time from the immediately preceding zero crossing of the AC main voltage. In such an approach, the elapsed time from the immediately preceding zero crossing of the AC main voltage is calculated as (time of ½ cycle of the AC mains voltage-time of ½ of the specified length of the NFC communications time slot).

Normally, the AC main switching frequency is fixed (typically either 50 or 60 Hz) and is tightly regulated. However, in cases where the wireless power transmitter is fed from a polluted or sub-standard AC voltage source or during load switchover, there can be cases where the upcoming zero crossing of the AC mains voltage does not occur at the expected time but rather occurs earlier than expected or later than expected. If an upcoming zero crossing of the AC mains voltage occurs earlier than expected or later than expected, then the NFC communication may not happen at the desired time interval or the NFC slot is missed. There can be scenarios where the transmitter may detect that receiver has been removed or there can be some overlap between the power transfer and the NFC communications and possible communication disruption and/or damage.

Applicant has identified many technical challenges and difficulties associated with such wireless power systems. Through applied effort, ingenuity, and innovation, Applicant has solved problems related to such wireless power systems by developing solutions embodied in the present disclosure, which are described in detail below.

BRIEF SUMMARY

Various embodiments described herein related to wireless power transmitters and associated methods of determining an NFC time slot in a wireless power transmitter.

In accordance with various embodiments of the present disclosure, a wireless power transmitter is provided. In some embodiments, the wireless power transmitter comprises an inverter electrically connected to a transmit power coil, adapted to receive an alternating current (AC) input voltage, and configured to provide power to the transmit power coil to enable wireless power transmission; near field communication (NFC) transmit circuitry electrically connected to an NFC transmit coil and configured to provide power to the NFC transmit coil to enable NFC communication; and a controller electrically connected to the inverter and to the NFC transmit circuitry and configured to disable the inverter from providing power to the transmit power coil and enable the NFC transmit circuitry to provide power to the NFC transmit coil during each of a plurality of NFC communication time slots. A beginning and an end of each of the plurality of NFC communication time slots is determined based on the AC input voltage.

In some embodiments, the wireless power transmitter further comprises a voltage divider to provide a reduced value of the AC input voltage, and voltage comparison circuitry to receive the reduced value of the AC input voltage from the voltage divider. The voltage comparison circuitry is configured to compare the reduced value of the AC input voltage to a reference voltage that corresponds to an expected voltage at the beginning and at the end of each of the plurality of NFC communication time slots.

In some embodiments, the reduced value of the AC input voltage provided by the voltage divider comprises a reduced value of the AC input voltage from a line connection and a reduced value of the AC input voltage from a neutral connection. The voltage comparison circuitry comprises a first comparator and a second comparator. The first comparator receives the reduced value of the AC input voltage from the neutral connection and compares the reduced value of the AC input voltage from the neutral connection to the reference voltage. The second comparator receives the reduced value of the AC input voltage from the line connection and compares the reduced value of the AC input voltage from the line connection to the reference voltage.

In some embodiments, the first comparator comprises an inverting input, a non-inverting input, and an output. The inverting input of the first comparator receives the reduced value of the AC input voltage from the neutral connection and the non-inverting input of the first comparator receives the reference voltage. The second comparator comprises an inverting input, a non-inverting input, and an output. The inverting input of the second comparator receives the reduced value of the AC input voltage from the line connection and the non-inverting input of the first comparator receives the reference voltage. The output of the first comparator and the output of the second comparator are provided to the controller. Wherein, for each of the plurality of NFC communication time slots occurring when the AC input voltage goes from positive to negative, the controller determines the beginning when the output of the first comparator goes from low to high and the controller determines the end when the output of the second comparator goes from high to low. Wherein, for each of the plurality of NFC communication time slots occurring when the AC input voltage goes from negative to negative, the controller determines the beginning when the output of the second comparator goes from low to high and the controller determines the end when the output of the first comparator goes from high to low.

In some embodiments, the reference voltage is fixed.

In some embodiments, the reference voltage is adjustable to adjust the beginning and the end of each of the plurality of NFC communication time slots.

In accordance with various embodiments of the present disclosure, a wireless power transmitter is provided. In some embodiments, the wireless power transmitter comprises an inverter electrically connected to a transmit power coil, adapted to receive an alternating current (AC) input voltage, and configured to provide power to the transmit power coil to enable wireless power transmission; near field communication (NFC) transmit circuitry electrically connected to an NFC transmit coil and configured to provide power to the NFC transmit coil to enable NFC communication; a controller electrically connected to the inverter and to the NFC transmit circuitry and configured to disable the inverter from providing power to the transmit power coil and enable the NFC transmit circuitry to provide power to the NFC transmit coil during each of a plurality of NFC communication time slots; a voltage divider to provide a reduced value of the AC input voltage from a line connection and a reduced value of the AC input voltage from a neutral connection; a first comparator comprising an inverting input, a non-inverting input, and an output; a second comparator comprising an inverting input, a non-inverting input, and an output. The inverting input of the first comparator receives the reduced value of the AC input voltage from the neutral connection and the non-inverting input of the first comparator receives a reference voltage that corresponds to an expected voltage at a beginning and at an end of each of the plurality of NFC communication time slots. The inverting input of the second comparator receives the reduced value of the AC input voltage from the line connection and the non-inverting input of the first comparator receives the reference voltage. The output of the first comparator and the output of the second comparator are provided to the controller. For each of the plurality of NFC communication time slots occurring when the AC input voltage goes from positive to negative, the controller determines the beginning when the output of the first comparator goes from low to high and the controller determines the end when the output of the second comparator goes from high to low. For each of the plurality of NFC communication time slots occurring when the AC input voltage goes from negative to negative, the controller determines the beginning when the output of the second comparator goes from low to high and the controller determines the end when the output of the first comparator goes from high to low.

In accordance with various embodiments of the present disclosure, a method of determining a near field communication (NFC) time slot in a wireless power transmitter is provided. In some embodiments, the method comprises electrically connecting an inverter of a wireless power transmitter to an alternating current (AC) input voltage, the inverter electrically connected to a transmit power coil and configured to provide power to the transmit power coil to enable wireless power transmission; determining a beginning and an end of each of a plurality of NFC communication time slots based on the AC input voltage; and during each of the plurality of NFC communication time slots, disabling the inverter from providing power to the transmit power coil and enabling an NFC transmit circuitry electrically connected to an NFC transmit coil to provide power to the NFC transmit coil to enable NFC communication.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various embodiments of the present disclosure overcome the above technical challenges and difficulties and provide various technical improvements and advantages based on, for example, but not limited to, providing example wireless power transmitters in which the beginning and the end of each of a plurality of NFC communication time slots are determined in real time based on the AC main voltage input (which may also be termed the AC input voltage) to the wireless power transmitter.

In various embodiments, the AC input voltage is reduced, and the reduced value of the AC input voltage is compared to a predetermined reference voltage that corresponds to the expected voltage at the desired start and stop times of the NFC communications time slot.

In various embodiments, the AC input voltage is reduced by a voltage divider. In various embodiments, the voltage divider reduces the neutral connection of the AC input voltage and separately reduces the line connection of the AC input voltage. In various embodiments, the reduced voltage of the neutral connection is provided to the inverting input of a first comparator and the reference voltage is provided to the non-inverting input of the first comparator, the reduced voltage of the line connection is provided to the inverting input of a second comparator and the reference voltage is provided to the non-inverting input of the second comparator, and the outputs of the first and second comparator are provided to a microcontroller unit (MCU) (which may also be termed a controller, a processor, processing circuitry, or the like). In various embodiments, the MCU determines the beginning and ending of each of the plurality of NFC communication time slots. There are two NFC communication time slots in one AC mains cycle—a first one at the zero crossing when the AC main voltage goes from positive to negative and a second one at the zero crossing when the AC main voltage goes from negative to positive. The MCU determines the beginning of each of the first NFC communication time slots (at the zero crossing when the AC main voltage goes from positive to negative) when the output of the first comparator goes from low to high, and the MCU determines the end of each of the first NFC communication time slots when the output of the second comparator goes from high to low. Similarly, the MCU determines the beginning of each of the second NFC communication time slots (at the zero crossing when the AC main voltage goes from negative to positive) when the output of the second comparator goes from low to high, and the MCU determines the end of each of the second NFC communication time slots when the output of the first comparator goes from high to low. These determinations repeat for each cycle of the AC main voltage.

Figure 1:
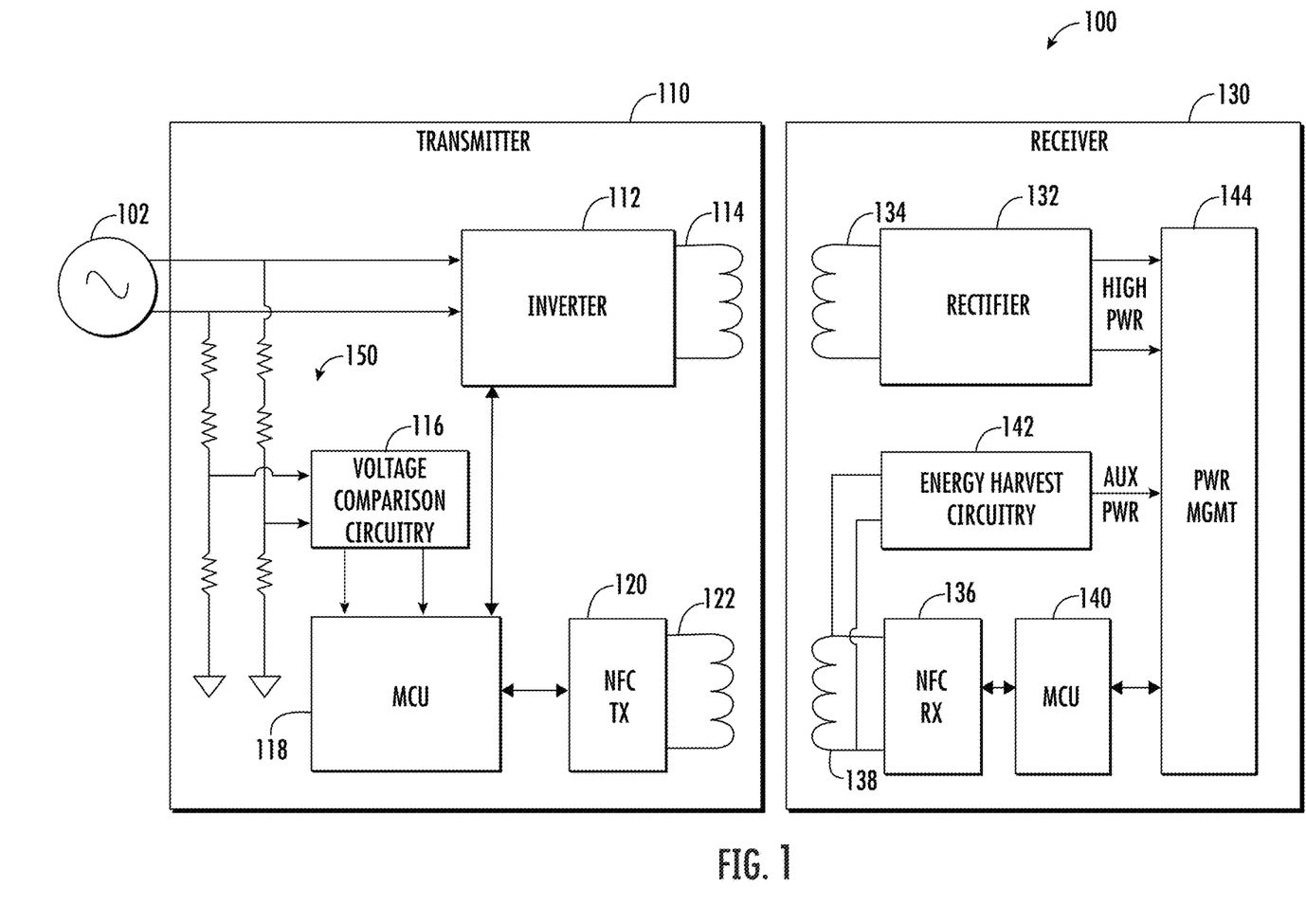
FIG. 1 is a block diagram of an example wireless power system, in accordance with some embodiments of the present disclosure.

Referring now to the figures, FIG. 1 is a block diagram of an example wireless power system in accordance with some embodiments of the present disclosure. As seen in FIG. 1, an example wireless power system 100 comprises a wireless power transmitter 110 and a wireless power receiver 130. For example, the example wireless power system 100 may be a wireless appliance system conforming to the Ki Cordless Kitchen standard, in which the wireless power transmitter 110 is a standalone transmitter and the wireless power receiver 130 is a small kitchen appliance. In the illustrated embodiment, the wireless power transmitter 110 comprises an inverter 112 electrically connected to a transmit (Tx) power coil 114, a near field communication (NFC) Tx module 120 electrically connected to an NFC Tx coil 122, a voltage divider 150, voltage comparison circuitry 116, and a microcontroller (MCU) 118 electrically connected to the inverter 112, the NFC transmit module 120, and the voltage comparison circuitry 116. In the illustrated embodiment, the wireless power receiver 130 comprises a rectifier 132 electrically connected to a receive (Rx) power coil 134, an NFC Rx module 136 electrically connected to an NFC Rx coil 138, energy harvest circuitry 142 electrically connected to the NFC Rx coil 138, an MCU 140 electrically connected to the NFC Rx module 136, and power management circuitry 144 electrically connected to the rectifier 132, the energy harvest circuitry 142, and the MCU 140.

In various embodiments, the transmitter 110 receives AC power from the AC main 102 and the inverter 112 energizes the Tx power coil 114. The Tx power coil 114 energizes the Rx power coil 134, which provides power to the rectifier 132, which in turn provides high power for operation to the rest of the receiver 130 via the power management circuitry 144. In various embodiments, the NFC Tx module 120 energizes the NFC Tx coil 122. The NFC Tx coil 122 energizes the NFC Rx coil to enable NFC communication between the transmitter 110 and the receiver 130. In various embodiments, during setup of the system, the (much lower) power required by the receiver 130 is sent from the transmitter 110 to the receiver via the NFC coils 122, 138. This auxiliary power is obtained from the NFC Rx coils 138 via the energy harvest circuitry 142, from which the auxiliary power is provided to the rest of the receiver 130 via the power management circuitry 144.

Figure 2:
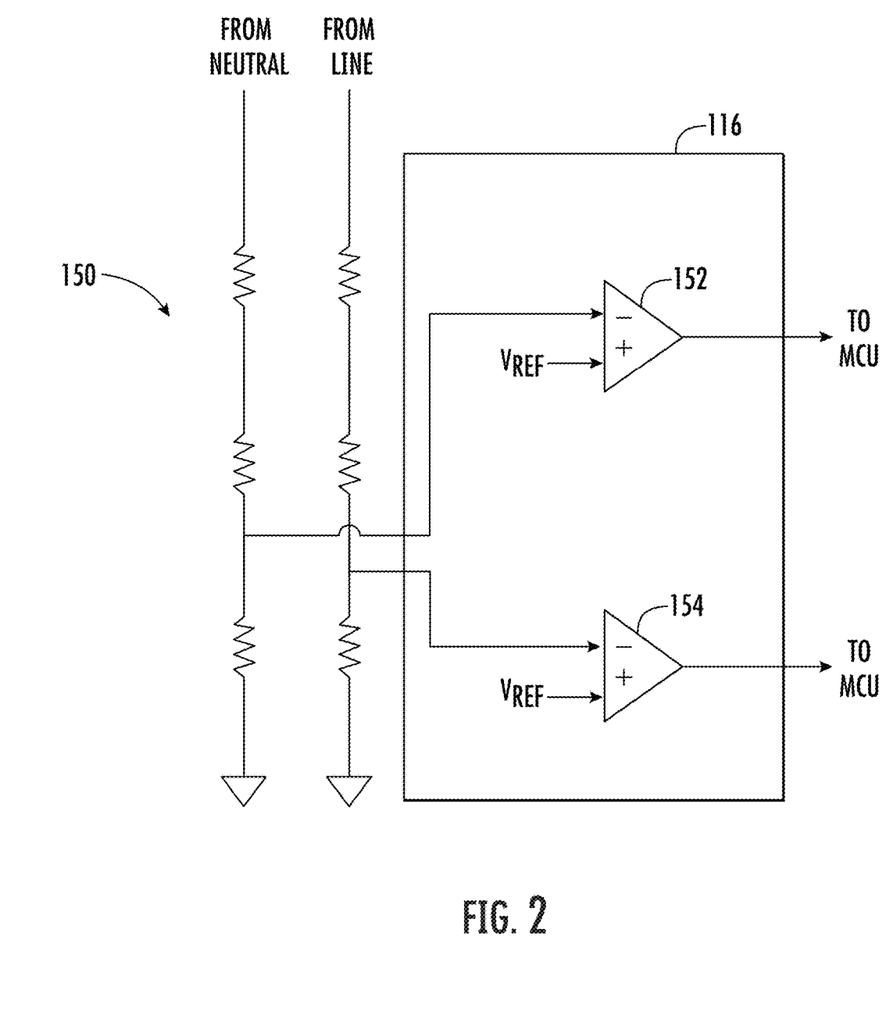
FIG. 2 is a circuit diagram of one block of the example wireless power system of FIG. 1.

Referring now to FIG. 2, an example circuit diagram of the voltage comparison circuitry 116 of the example wireless power system of FIG. 1 is illustrated. In various embodiments, the voltage comparison circuitry 116 comprises a first comparator 152 and a second comparator 154. In various embodiments, the first comparator 152 and the second comparator 154 each comprise an inverting input ("−"), a non-inverting input ("+"), and an output. In various embodiments, the inverting input of the first comparator 152 receives the reduced value of the AC input voltage from the neutral connection and the non-inverting input of the first comparator 152 receives the reference voltage, while the inverting input of the second comparator 154 receives the reduced value of the AC input voltage from the line connection and the non-inverting input of the second comparator 154 receives the reference voltage. In one example embodiment, the AC input voltage is reduced from a peak of 110 volts (V) to a peak of about 1.7V, and the reference voltage is about 0.4V. In various embodiments, the reference voltage can be provided by any suitable device, component, circuitry, etc., such as an external voltage source or a Digital to Analog converter (DAC) that is internal to the MCU.

In various embodiments, the reference voltage is typically fixed but may be variable. In some embodiments, the reference voltage is initially selected such that the length of each NFC communication slot is about 1.5 millisecond (ms), as per the Ki Cordless Kitchen standard. During operation, the time of the NFC communication can be determined (such as by the MCU 118), and, if the entire 1.5 ms time of the NFC communication slots is not needed, the reference voltage can be reduced to shorten the NFC communication slots. In some embodiments, the reduced reference voltage is selected such that the NFC communication slots are long enough for the determined time of the NFC communication, plus a buffer (e.g., 20%). In such embodiments, the reference voltage is altered simultaneously for both the first and second comparators to have symmetry around the zero crossings, which will assist in improving power factor.

MCU 118 and/or MCU 140 may be embodied in a number of different ways. In various embodiments, the use of the terms "microcontroller unit," "MCU," "controller," "controller circuitry," "processor" or "processing circuitry" should be understood to include a single core processor, a multi-core processor, multiple processors internal to the transmitter 110 and/or the receiver 130, and/or one or more remote or "cloud" processor(s) external to the transmitter 110 and/or the receiver 130. In some example embodiments, MCU 118 and/or MCU 140 may include one or more processing devices configured to perform independently. Alternatively, or additionally, MCU 118 and/or MCU 140 may include one or more processor(s) configured in tandem via a bus to enable independent execution of operations, instructions, pipelining, and/or multithreading.

In an example embodiment, the MCU 118 and/or MCU 140 may be configured to execute instructions stored in memory circuitry (not illustrated) or otherwise accessible to the MCU. Alternatively, or additionally, the MCU 118 and/or MCU 140 may be configured to execute hard-coded functionality. As such, whether configured by hardware or software methods, or by a combination thereof, MCU 118 and/or MCU 140 may represent an entity (e.g., physically embodied in circuitry) capable of performing operations according to embodiments of the present disclosure while configured accordingly. Alternatively, or additionally, MCU 118 and/or MCU 140 may be embodied as an executor of software instructions, and the instructions may specifically configure the MCU 118 and/or MCU 140 to perform the various algorithms embodied in one or more operations described herein when such instructions are executed. In some embodiments, the MCU 118 and/or MCU 140 includes hardware, software, firmware, and/or a combination thereof that performs one or more operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitries both leverage use of the same processor(s), memory(ies), circuitry(ies), and/or the like to perform their associated functions such that duplicate hardware is not required for each set of circuitry.

Figure 3:
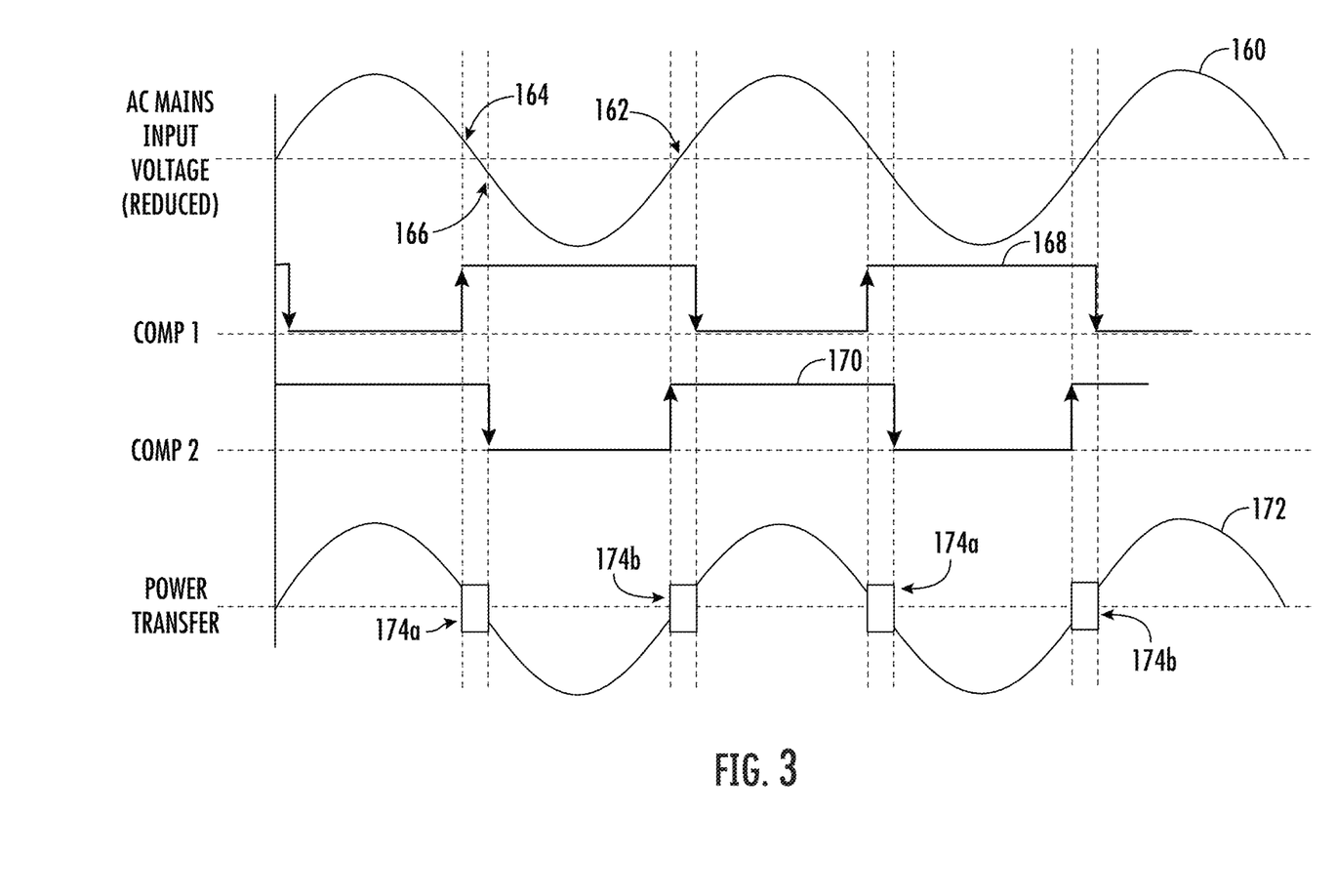
FIG. 3 illustrates example waveforms of an example wireless power system, in accordance with an example embodiment of the present disclosure.

Referring now to FIG. 3, example waveforms associated with an example wireless power system of embodiments of the present disclosure are illustrated. In FIG. 3, two and a half cycles of the AC input voltage 160 are shown, with six zero crossing points 162, along with the associated waveform 172 of the power that is transferred from the transmitter 110 to the receiver 130. A plurality of NFC communication time slots 174a, 174b are illustrated at each zero-crossing point, during which the power transfer 172 is stopped. NFC communication time slots 174a occur at the zero crossing when the AC main voltage goes from positive to negative, and NFC communication time slots 174b occur at the zero crossing when the AC main voltage goes from negative to positive. Also in FIG. 3, the output waveform 168 of the first comparator 152 and the output waveform 170 of the second comparator 154 are shown.

As seen in FIG. 3, the output waveform 168 of the first comparator 152 goes from 0 to 1 when the positive half signal of the AC waveform decreases to the reference voltage and from 1 to 0 when the positive half signal of the AC waveform increases to the reference voltage, while the output waveform 170 of the second comparator 154 goes from 1 to 0 when the negative half signal of the AC waveform decreases to the reference voltage and from 0 to 1 when the negative half signal of the AC waveform increases to the reference voltage. In this regard, the comparator output signals can be used as an interrupt to the MCU 118 of the transmitter 110 to start and end the NFC communication slots 174a, 174b. Specifically, in the illustrated embodiment, the NFC communication slots 174a (occurring at the zero crossings when the AC main voltage goes from positive to negative) begin when the output of the first comparator 152 goes from 0 to 1 and ends when the output of the second comparator 154 goes from 1 to 0. Also, in the illustrated embodiment, the NFC communication slots 174b (occurring at the zero crossings when the AC main voltage goes from negative to positive) begins when the output of the second comparator 154 goes from 0 to 1 and ends when the output of the first comparator 152 goes from 1 to 0. As such, the beginning and end of the NFC communication slots are determined in real time, regardless of any irregularity in the timing of the AC main voltage.

By using embodiments of the present disclosure as described herein, the NFC communication slots for a wireless power system can be determined without needing to determine the last zero crossing. Also, if there is a frequency change due to transients or during a switch over, embodiments of the present disclosure ensure proper timing of the NFC communication slot to avoid any time deviation of the NFC communication slots and ensure that NFC communication does not happen while transmitting power.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to fragmented wideband tympanometry techniques for true wireless stereo, however, one skilled in the art may recognize that such principles may be applied to any audio device. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of wireless power systems and devices, such as but not limited to smart cordless appliances adhering to the Ki Kitchen standard.

Within the appended claims, unless the specific term "means for" or "step for" is used within a given claim, it is not intended that the claim be interpreted under 35 U.S.C. 112, paragraph 6.

What is claimed is:

1. A wireless power transmitter comprising:
    an inverter electrically connected to a transmit power coil, adapted to receive an alternating current (AC) input voltage, and configured to provide power to the transmit power coil to enable wireless power transmission;
    near field communication (NFC) transmit circuitry electrically connected to an NFC transmit coil and configured to provide power to the NFC transmit coil to enable NFC communication; and
    a controller electrically connected to the inverter and to the NFC transmit circuitry and configured to disable the inverter from providing power to the transmit power coil and enable the NFC transmit circuitry to provide power to the NFC transmit coil during each of a plurality of NFC communication time slots;
    wherein a beginning and an end of each of the plurality of NFC communication time slots is determined based on the AC input voltage.

2. The wireless power transmitter of claim 1, further comprising:
    a voltage divider to provide a reduced value of the AC input voltage; and
    voltage comparison circuitry to receive the reduced value of the AC input voltage from the voltage divider;
    wherein the voltage comparison circuitry is configured to compare the reduced value of the AC input voltage to a reference voltage that corresponds to an expected voltage at the beginning and at the end of each of the plurality of NFC communication time slots.

3. The wireless power transmitter of claim 2, wherein the reduced value of the AC input voltage provided by the voltage divider comprises a reduced value of the AC input voltage from a line connection and a reduced value of the AC input voltage from a neutral connection;
    wherein the voltage comparison circuitry comprises a first comparator and a second comparator;
    wherein the first comparator receives the reduced value of the AC input voltage from the neutral connection and compares the reduced value of the AC input voltage from the neutral connection to the reference voltage; and
    wherein the second comparator receives the reduced value of the AC input voltage from the line connection and compares the reduced value of the AC input voltage from the line connection to the reference voltage.

4. The wireless power transmitter of claim 3, wherein the first comparator comprises an inverting input, a non-inverting input, and an output;
    wherein the inverting input of the first comparator receives the reduced value of the AC input voltage from the neutral connection and the non-inverting input of the first comparator receives the reference voltage;
    wherein the second comparator comprises an inverting input, a non-inverting input, and an output;
    wherein the inverting input of the second comparator receives the reduced value of the AC input voltage from the line connection and the non-inverting input of the first comparator receives the reference voltage;
    wherein the output of the first comparator and the output of the second comparator are provided to the controller;
    wherein, for each of the plurality of NFC communication time slots occurring when the AC input voltage goes from positive to negative, the controller determines the beginning when the output of the first comparator goes from low to high and the controller determines the end when the output of the second comparator goes from high to low; and
    wherein, for each of the plurality of NFC communication time slots occurring when the AC input voltage goes from negative to positive, the controller determines the beginning when the output of the second comparator goes from low to high and the controller determines the end when the output of the first comparator goes from high to low.

5. The wireless power transmitter of claim 2, wherein the reference voltage is fixed.

6. The wireless power transmitter of claim 2, wherein the reference voltage is adjustable to adjust the beginning and the end of each of the plurality of NFC communication time slots.

7. A wireless power transmitter comprising:
an inverter electrically connected to a transmit power coil, adapted to receive an alternating current (AC) input voltage, and configured to provide power to the transmit power coil to enable wireless power transmission;
near field communication (NFC) transmit circuitry electrically connected to an NFC transmit coil and configured to provide power to the NFC transmit coil to enable NFC communication;
a controller electrically connected to the inverter and to the NFC transmit circuitry and configured to disable the inverter from providing power to the transmit power coil and enable the NFC transmit circuitry to provide power to the NFC transmit coil during each of a plurality of NFC communication time slots;
a voltage divider to provide a reduced value of the AC input voltage from a line connection and a reduced value of the AC input voltage from a neutral connection;
a first comparator comprising an inverting input, a non-inverting input, and an output;
a second comparator comprising an inverting input, a non-inverting input, and an output;
wherein the inverting input of the first comparator receives the reduced value of the AC input voltage from the neutral connection and the non-inverting input of the first comparator receives a reference voltage that corresponds to an expected voltage at a beginning and at an end of each of the plurality of NFC communication time slots;
wherein the inverting input of the second comparator receives the reduced value of the AC input voltage from the line connection and the non-inverting input of the first comparator receives the reference voltage;
wherein the output of the first comparator and the output of the second comparator are provided to the controller;
wherein, for each of the plurality of NFC communication time slots occurring when the AC input voltage goes from positive to negative, the controller determines the beginning when the output of the first comparator goes from low to high and the controller determines the end when the output of the second comparator goes from high to low; and
wherein, for each of the plurality of NFC communication time slots occurring when the AC input voltage goes from negative to positive, the controller determines the beginning when the output of the second comparator goes from low to high and the controller determines the end when the output of the first comparator goes from high to low.

8. The wireless power transmitter of claim 7, wherein the reference voltage is fixed.

9. The wireless power transmitter of claim 7, wherein the reference voltage is adjustable to adjust the beginning and the end of each of the plurality of NFC communication time slots.

10. A method of determining a near field communication (NFC) time slot in a wireless power transmitter, the method comprising:
electrically connecting an inverter of a wireless power transmitter to an alternating current (AC) input voltage, the inverter electrically connected to a transmit power coil and configured to provide power to the transmit power coil to enable wireless power transmission;
determining a beginning and an end of each of a plurality of NFC communication time slots based on the AC input voltage; and
during each of the plurality of NFC communication time slots, disabling the inverter from providing power to the transmit power coil and enabling an NFC transmit circuitry electrically connected to an NFC transmit coil to provide power to the NFC transmit coil to enable NFC communication.

11. The method of claim 10, further comprising:
providing, by a voltage divider of the wireless power transmitter, a reduced value of the AC input voltage to a voltage comparison circuitry of the wireless power transmitter; and
comparing, by the voltage comparison circuitry, the reduced value of the AC input voltage to a reference voltage that corresponds to an expected voltage at the beginning and at the end of each of the plurality of NFC communication time slots.

12. The method of claim 11, wherein the reduced value of the AC input voltage provided by the voltage divider comprises a reduced value of the AC input voltage from a line connection and a reduced value of the AC input voltage from a neutral connection;
wherein the voltage comparison circuitry comprises a first comparator and a second comparator;
wherein the method further comprises:
receiving, by the first comparator, the reduced value of the AC input voltage from the neutral connection;
comparing, by the first comparator, the reduced value of the AC input voltage from the neutral connection to the reference voltage;
receiving, by the second comparator, the reduced value of the AC input voltage from the line connection; and
comparing, by the second comparator, the reduced value of the AC input voltage from the line connection to the reference voltage.

13. The method of claim 12, wherein the first comparator comprises an inverting input, a non-inverting input, and an output;
wherein the second comparator comprises an inverting input, a non-inverting input, and an output;
wherein the method further comprises:
receiving, by the inverting input of the first comparator, the reduced value of the AC input voltage from the neutral connection;
receiving, by the non-inverting input of the first comparator, the reference voltage;
receiving, by the inverting input of the second comparator, the reduced value of the AC input voltage from the line connection;
receiving, by the non-inverting input of the first comparator, the reference voltage;
providing the output of the first comparator and the output of the second comparator to a controller of the wireless power transmitter;
determining, by the controller for each of the plurality of NFC communication time slots occurring when the AC input voltage goes from positive to negative, the beginning when the output of the first comparator goes from low to high and the end when the output of the second comparator goes from high to low; and
determining, by the controller for each of the plurality of NFC communication time slots occurring when the AC input voltage goes from negative to positive, the beginning when the output of the second comparator goes from low to high and the end when the output of the first comparator goes from high to low.

14. The method of claim 11, wherein the reference voltage is fixed.

15. The method of claim 11, further comprising adjusting the reference voltage to adjust the beginning and the end of each of the plurality of NFC communication time slots.

\* \* \* \* \*